F. C. H. STRASBURGER.

FILLING MACHINE.

APPLICATION FILED NOV. 25, 1910.

Reissued Jan. 17, 1911.

13,197.

Witnesses:

Geo. C. Farrin

S. J. Wilson

Inventor:

Frank C. H. Strasburger

By Linthicum, Bell & Fuller

Attys.

UNITED STATES PATENT OFFICE.

FRANK C. H. STRASBURGER, OF CHICAGO, ILLINOIS, ASSIGNOR TO BOTTLERS MACHINERY MANUFACTURING COMPANY, OF CHICAGO, ILLINOIS, A CORPORATION OF ILLINOIS.

FILLING-MACHINE.

13,197. Specification of Reissued Letters Patent. Reissued Jan. 17, 1911.

Original No. 956,867, dated May 3, 1910, Serial No. 510,873. Application for reissue filed November 25, 1910. Serial No. 594,227.

*To all whom it may concern:*

Be it known that I, FRANK C. H. STRASBURGER, a citizen of the United States, residing at Chicago, in the county of Cook and State of Illinois, have invented certain new and useful Improvements in Filling-Machines, of which the following is a specification.

This invention relates to machines for filling bottles with beer or other charged liquids and its object is generally to accomplish the filling operation without the loss of gas in suspension in the liquid and without the production of foam in the bottles.

In the attainment of this primary object the invention also has for its objects to simplify and improve the construction of a mechanism of this character such as that set forth in my Patent No. 948,463, issued February 8, 1910, in which the pressure in the liquid tank is utilized for closing the liquid valve; in which a counter-pressure is established in the bottle before the liquid valve is opened; and in which the liquid valve is operated by a diaphragm.

Another object of the invention is to provide a filling mechanism of simple and novel construction which requires no stuffing boxes whatever and embodies a liquid valve located at the lower end of the filling tube and operated by pressure in the tank to prevent dripping.

Figure 1:
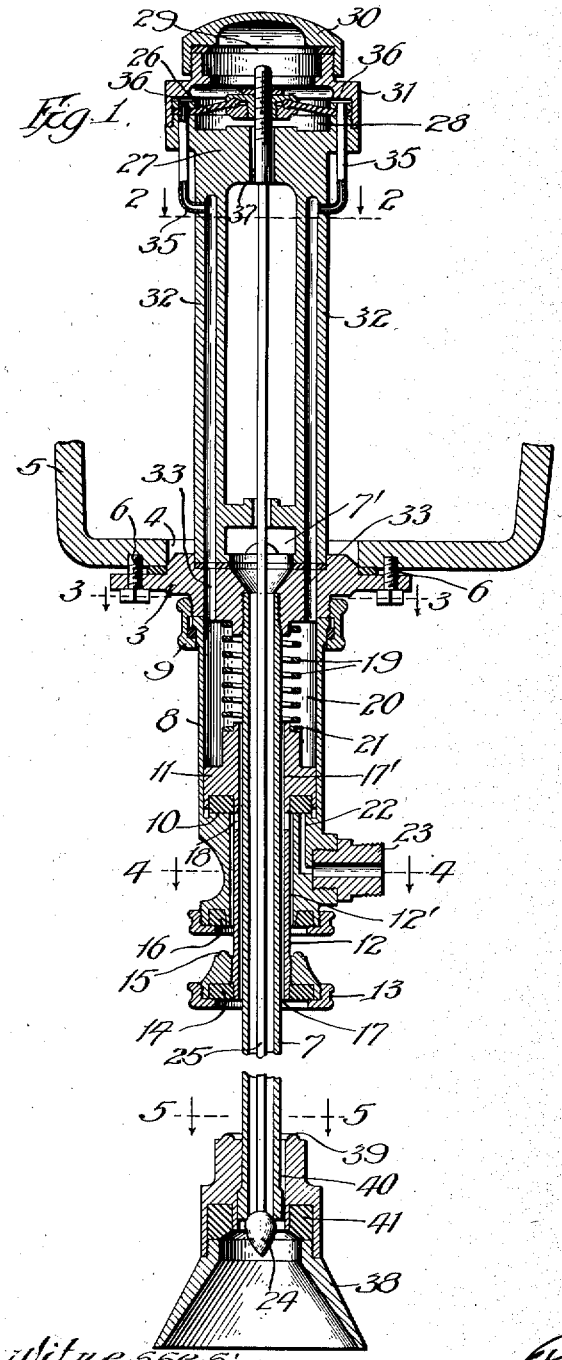
Figure 2:
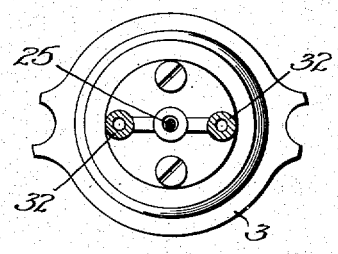
Figure 3:
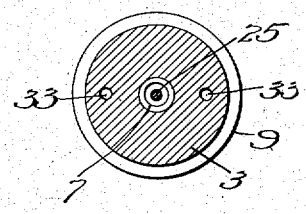
Figure 4:
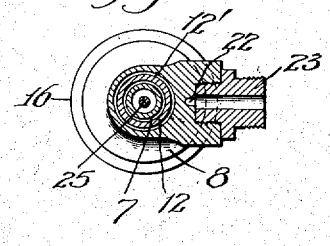
Figure 5:
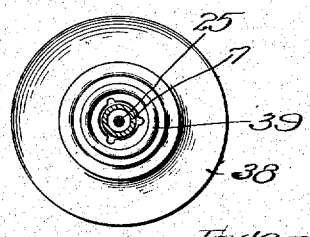

In the accompanying drawings illustrating the invention—Figure 1 is a sectional elevation of the machine. Figs. 2, 3, 4 and 5 are sectional views on the lines 2—2, 3—3, 4—4, and 5—5, respectively, of Fig. 1.

Referring to the drawings 3 designates the body of the filling mechanism which is secured in an opening 4 in the bottom of the liquid tank 5 by bolts 6, as shown, or by any other suitable means. A depending filling tube 7 is secured to the body and communicates with a fluid passage 7′ therein. A valve casing 8 is secured beneath the body 3 by a threaded ring 9 and this valve casing is provided with a horizontal seat 10 for the air valve 11 which is arranged to fit snugly in the casing and is adapted to move vertically therein. A sleeve 12 is made integral with or fastened to the air valve 11 and it extends down on the filling tube through the lower end of the casing 8 and carries a head 13 at its lower end. This head is provided on its under side with a gasket 14 and on its upper side with a circular rib 15 to engage the gasket 16 at the lower end of the valve casing. An air passage 17 is provided between the filling tube and the sleeve 12 and this passage is extended upward at 17′ between the filling tube and the air valve and is provided just below the air valve with one or more lateral ports 18. An air passage 12′ is also provided between the sleeve and the casing. A spring 19 is arranged on the filling tube within the air chamber 20 and between the body 3 and the reduced shoulder 21 at the upper end of the air valve and this spring normally holds said valve seated to close the air inlet passage 22.

If it is desired merely to equalize the pressure in the bottle and the tank before the filling operation begins the air pressure may be supplied through a tube connected to the nipple 23 and extending up in the liquid tank above the level of the liquid therein, in a familiar manner; but if it is desired to obtain a greater pressure in the bottle than in the liquid tank this air tube may be connected with a suitable source of air supply. The latter arrangement is employed to compensate for the hydrostatic head of the liquid in the filling tube which is of more or less importance as the case may be under varying conditions which exist in bottling houses.

The liquid valve 24 is arranged to seal the lower end of the filling tube and is carried by a rod 25 which is connected at its upper end to a diaphragm 26. This diaphragm is secured in a casing designated generally 27 and provided with a pressure chamber 28 below the diaphragm and a counter-pressure chamber 29 above the diaphragm. The casing also comprises a removable cap 30 and collar 31 and two tubular members 32 which register with passages 33 in the body 3. The tubular members are of sufficient length to support the upper part of the casing above the usual level of the liquid in the tank. Air tubes 35 lead from the tubular members 32 and communicate with passages 36 which open into the counter-pressure chamber 29. The opening 37 in the casing 27 through which the rod 25 passes is sufficiently large to permit constant communication between the pressure chamber 28 and the tank so that the pressure in said chamber will always be equal to the pressure in the tank. The tank is of any suitable form and is made air tight to confine a certain degree of pressure therein, as required, and this pressure acts upon the diaphragm to hold the liquid valve normally seated against the lower end of the filling tube.

The chamber 29 is normally open to the atmosphere through the passages 36, the air tubes 35, tubular members 32, passages 33, air chamber 20, air passages 17′ and 17, ports 18 and passage 12′.

The centering bell 38 is slidably arranged on the filling tube 7 to properly position the bottles thereon and it has a circular rib 39 at its upper end to engage the gasket 14 on the head 13 of the air valve. The centering bell has an air passage 40 to register with the passage 17.

In practice the air valve is held normally closed by the spring 19 and the liquid valve is held normally closed by the pressure in the chamber 28 under the diaphragm, the chamber 29 above the diaphragm being normally open to the atmosphere as before stated. When a bottle is moved up to filling position it first engages the gasket 41 in the centering bell and pushes the bell against the head 13 and unseats the air valve 11. This admits pressure from the air inlet passage 22 through ports 18, and passages 17 and 40 to the bottle, and at the same time through the passage 17′, air chamber 20, tubular supports 32, air tubes 35 and passages 36 to the chamber 29. When the pressure in the chamber 29 is equalized with or made greater than the pressure below the diaphragm in the chamber 28 the liquid valve will be opened and by this time the counter-pressure has been established in the bottle. If the pressure on both sides of the diaphragm is merely equalized the liquid valve will open by gravity and the weight of the column of liquid sustained thereby; if there is a greater pressure above than below the diaphragm this will assist in opening the liquid valve. The liquid valve is opened by the same pressure that is admitted to the bottle and this occurs when the counter-pressure has been fully established in the bottle so that the liquid will flow "dead" into the bottle and without the loss of gas or the production of foam. When the bottle is filled and lowered on the filling tube the spring 19 presses the head 13 away from the gasket 16, opening passage 12′ to the atmosphere, and presses the valve 11 to its seat thereby closing the air inlet passage 22. As the bottle continues on its downward movement the centering bell drops away from the head 13 and uncovers the air passage 17. When the passage 12′ is uncovered the pressure in chamber 29 lowers sufficiently to permit the pressure in the chamber 28 on the underside of the diaphragm, which is the pressure in the tank, to raise the liquid valve to seal the lower end of the filling tube. Thus the liquid valve is closed before or at least at the same time that the air valve is closed and hence pressure is maintained on the liquid in the bottle as long as the liquid valve is open, thereby preventing the escape of liquid from the filling tube after the pressure is relieved which might agitate the liquid in the bottle and produce foam. The passages 12′ and 17 permit all the pressure in chambers 20 and 29 and their connecting passages and tubes to escape.

My invention simplifies the construction of filling valves of this character, it dispenses with the use of all stuffing boxes, and it simplifies and improves the operation of the valve. It is entirely automatic in operation and when once adjusted it needs no further attention. Any suitable means may be employed for raising and lowering the bottle to operate the valve mechanism.

What I claim and desire to secure by Letters Patent is:

1. In a counter-pressure filling machine, the combination of a liquid tank, a liquid valve, a diaphragm connected to said valve, said diaphragm being subjected on one side thereof to the pressure in the tank, and means for supplying a counter-pressure to the bottle and at the same time opening communication to supply sufficient pressure on the other side of the diaphragm to counter-balance the said pressure in the tank and permit the valve to open.

2. In a counter-pressure filling machine, the combination of a liquid tank, a filling tube depending from the tank, a casing on the tank surrounding the filling tube, an air inlet in the casing, a spring-pressed valve in the casing normally closing said air inlet, a sleeve surrounding said filling tube and rigid with the air valve, an air passage between the filling tube and the air valve, a port in the sleeve, a liquid valve, a diaphragm connected to said liquid valve, said diaphragm being subjected on one side thereof to the pressure in the tank, and means for raising said air valve to admit pressure from the air inlet through the port and the passage between the air valve and filling tube to counter-balance the tank pressure on the diaphragm and open the liquid valve.

3. In a counter-pressure filling machine, the combination of a liquid tank, a filling tube depending from the tank, a casing on the tank surrounding the filling tube, an air inlet in the casing, a spring-pressed valve in the casing normally closing said air inlet, a sleeve surrounding said filling tube and rigid with the air valve, an air outlet passage between the sleeve and the filling tube, another air outlet passage between the sleeve and the casing, a port in the sleeve, a head on the sleeve, a centering bell on the filling tube, an air passage between the filling tube and the bell, a liquid valve, a diaphragm connected to said liquid valve, said diaphragm being subjected on one side thereof to the pressure in the tank and said bell being movable vertically to engage said head and unseat the air valve to admit counter-pressure to the bottle and a counter-balancing pressure on the diaphragm to open the liquid valve.

4. In a counter-pressure filling machine, the combination of a liquid tank, a casing on the tank, a filling tube depending from the tank and through said casing, a liquid valve at the lower end of the tube, a rod fastened to the liquid valve and extending up through the tube into the tank, a pressure controlled diaphragm within the tank for operating the rod, an air inlet in the casing, an air valve within the casing to close said inlet, a sleeve on the filling tube extending down from the air valve through the casing, an air passage between the sleeve and filling tube and extending up between the air valve and filling tube, an air passage between the sleeve and the casing, and a port connecting the passages.

FRANK C. H. STRASBURGER.

Witnesses:

WM. F. BELT,

M. A. KIDDIE.